United States Patent [19]
Ross

[11] Patent Number: 5,755,106
[45] Date of Patent: May 26, 1998

[54] ICE CREAM MACHINE HAVING AN AUXILIARY EVAPORATION TANK

[76] Inventor: Harold F. Ross, 454 Hwy. M 35, Bark River, Mich. 49807

[21] Appl. No.: 869,040

[22] Filed: Jun. 4, 1997

Related U.S. Application Data

[63] Continuation of Ser. No. 602,302, Feb. 16, 1996, abandoned.

[51] Int. Cl.⁶ ..................................................... F25B 41/00
[52] U.S. Cl. .................... 62/217; 62/342; 62/503
[58] Field of Search ........................ 62/217, 220, 503, 62/342

[56] References Cited

U.S. PATENT DOCUMENTS

| | | |
|---|---|---|
| 967,503 | 8/1910 | Davis . |
| 1,698,941 | 1/1929 | Davenport ........................ 62/503 |
| 1,767,857 | 6/1930 | Sawyer . |
| 1,769,113 | 7/1930 | Davenport ........................ 62/220 |
| 1,791,041 | 2/1931 | Sawyer . |
| 1,818,364 | 8/1931 | Turnbow . |
| 2,070,729 | 2/1937 | Harsch et al. . |
| 2,156,096 | 4/1939 | Robinson ........................ 62/503 |
| 2,702,460 | 2/1955 | Gaugler ........................ 62/503 |
| 3,229,647 | 1/1966 | Von Drachenfels et al. . |
| 3,803,870 | 4/1974 | Conz . |
| 3,898,858 | 8/1975 | Erickson . |
| 4,094,168 | 6/1978 | Hamner et al. ........................ 62/503 |
| 4,332,145 | 6/1982 | Yuhasz et al. . |

*Primary Examiner*—William E. Tapolcai
*Attorney, Agent, or Firm*—Foley & Lardner

[57] ABSTRACT

An ice cream machine for cooling liquid ice cream into frozen ice cream includes an evaporator having a cylindrical cooling tank and an auxiliary tank. The auxiliary tank ensures that the cylindrical cooling tank is flooded with liquid refrigerant during normal operation. The flooding of the cylindrical cooling tank provides more efficient and even cooling in an interior cooling chamber. The more efficient cooling allows the ice cream machine to utilize a smaller compressor, thereby reducing the cost and energy consumption of the ice cream machine. The auxiliary tank can be a coil of tubing or a cylindrical container positioned above the cylindrical cooling tank.

20 Claims, 2 Drawing Sheets

ICE CREAM MACHINE HAVING AN AUXILIARY EVAPORATION TANK

This is a continuation application of application Ser. No. 08/602,302 of Ross, Harold F. filed Feb. 16, 1995 which is hereby abandoned.

FIELD OF THE INVENTION

The present invention relates to refrigeration or cooling systems. More particularly, the present invention relates to an ice cream machine having an auxiliary evaporator tank.

BACKGROUND OF THE INVENTION

Ice cream machines as well as other systems for cooling or freezing food stuffs, condiments, or other materials, typically include an evaporator situated proximate the material being chilled. For example, in ice cream machines, liquid ice cream is typically inserted in a freezing chamber adjacent the evaporator and is removed from the freezing chamber as solid or semi-solid ice cream. The evaporator removes heat from the freezing chamber as a liquid refrigerant such as FREON®, ammonia, HP62, 502 or other liquid having a low boiling point changes to vapor in response to the heat from the liquid ice cream. Typically, the evaporator is partially filled with vapor as the liquid refrigerant boils (e.g., becomes vapor) in the evaporator.

Since most heat transfer occurs when the liquid refrigerant is changed to vapor, the partially filled evaporator is less efficient than a flooded evaporator (e.g., an evaporator filled entirely with liquid refrigerant). The partially filled evaporator also tends to unevenly cool the ice cream because the parts of the evaporator which are filled with vapor are not able to cool as effectively as the parts of the evaporator filled with liquid. Further, prior art ice cream machines are disadvantageous because the pressure does not remain constant in the evaporator due to the accumulation of vapor. The inefficiencies resulting from the partially filled evaporator require the ice cream machine to use a larger, more expensive, and less energy efficient condenser or pump.

Thus, there is a need for an ice cream machine which utilizes a flooded evaporator. There is also a need for an evaporator which provides even cooling in the freezing chamber.

SUMMARY OF THE INVENTION

The present invention relates to an ice cream machine including a cylindrical evaporator having a refrigerant input and a refrigerant output, an evaporator reservoir having a reservoir input and a reservoir output, a compressor having a compressor input and a compressor output, and a condenser having a condenser input coupled to the compressor output and a condenser output coupled to the refrigerant input. The cylindrical evaporator has an interior surface defining a cooling chamber which has an ice cream input and an ice cream output. The reservoir input is coupled to the refrigerant output. The evaporator reservoir is located above the cylindrical evaporator with respect to gravity. The compressor input is coupled to the reservoir output. The refrigerant travels from the condenser through the cylindrical evaporator and the evaporator reservoir to the compressor. The refrigerant boils from its liquid state to a vapor state. The refrigerant accumulates as a vapor in the evaporator reservoir, thereby providing superior cooling in the cylindrical evaporator.

The present invention also relates to a cooling system for cooling a food stuff including a compressor, and evaporator in the shape of a hollow cylinder, and an auxiliary evaporator means. The evaporator has a refrigerant input and a refrigerant output and contains the food stuff. The auxiliary evaporator means is positioned above the evaporator with respect to gravity and receives liquid refrigerant from the refrigerant output of the evaporator. The auxiliary evaporator means provides the vapor refrigerant to the compressor. The compressor receives the vapor refrigerant and provides the liquid refrigerant to the evaporator. Superior cooling of the food stuff in the evaporator is obtained by completely filling the evaporator with the liquid refrigerant. The auxiliary evaporator means cause the evaporator to be completely filled with the liquid refrigerant.

The present invention also relates to an improved ice cream freezing machine including a tubular evaporator, a compressor, and a condenser. The tubular evaporator has a refrigerant input at a bottom side of the evaporator, a refrigerant output at the top side of the evaporator, and an interior surface defining an interior cooling chamber. The interior cooling chamber has an ice cream input and an ice cream output. The compressor has a compressor input and a compressor output. The condenser has a condenser input coupled to the compressor output and a condenser output coupled to the refrigerant input. The improvement includes an evaporator reservoir having a reservoir input coupled to the refrigerant output and a reservoir output coupled to the compressor input. The evaporator reservoir is located above the cylindrical evaporator with respect to gravity. A refrigerant travels from the condenser through the cylindrical evaporator and the evaporator reservoir to the compressor. The refrigerant is a liquid in the cylindrical evaporator. The refrigerant accumulates as a vapor in the evaporator reservoir, thereby providing superior cooling in the cooling chamber.

In one aspect of the present invention, an auxiliary tank is positioned above (e.g., located higher than) the evaporator. The auxiliary tank may be a coil of copper tubing or a container such as a cylindrical or spherical reservoir. The auxiliary tank ensures that the cylindrical evaporator is flooded with liquid refrigerant such as FREON or HP62. According to another aspect of the present invention, the evaporator is a cylindrical evaporator having an interior cooling chamber. Liquid ice cream is inserted into the interior cooling chamber and exits the cooling chamber as solid ice cream. Alternatively, yogurt, condiments, or other food stuffs may be chilled or frozen in the cooling chamber.

Preferably, low pressure liquid refrigerant enters the cylindrical evaporator at a bottom side and exits the cylindrical evaporator at a top side. The low pressure liquid refrigerant boils and accumulates as vapor in the auxiliary tank. The refrigerant returns to the compressor as low pressure vapor.

BRIEF DESCRIPTION OF THE DRAWINGS

The invention will hereafter be descried with reference to the accompanying drawings, wherein like reference numerals denote like elements, and.

DETAILED DESCRIPTION OF THE PREFERRED EXEMPLARY EMBODIMENT OF THE PRESENT INVENTION

Figure 1:
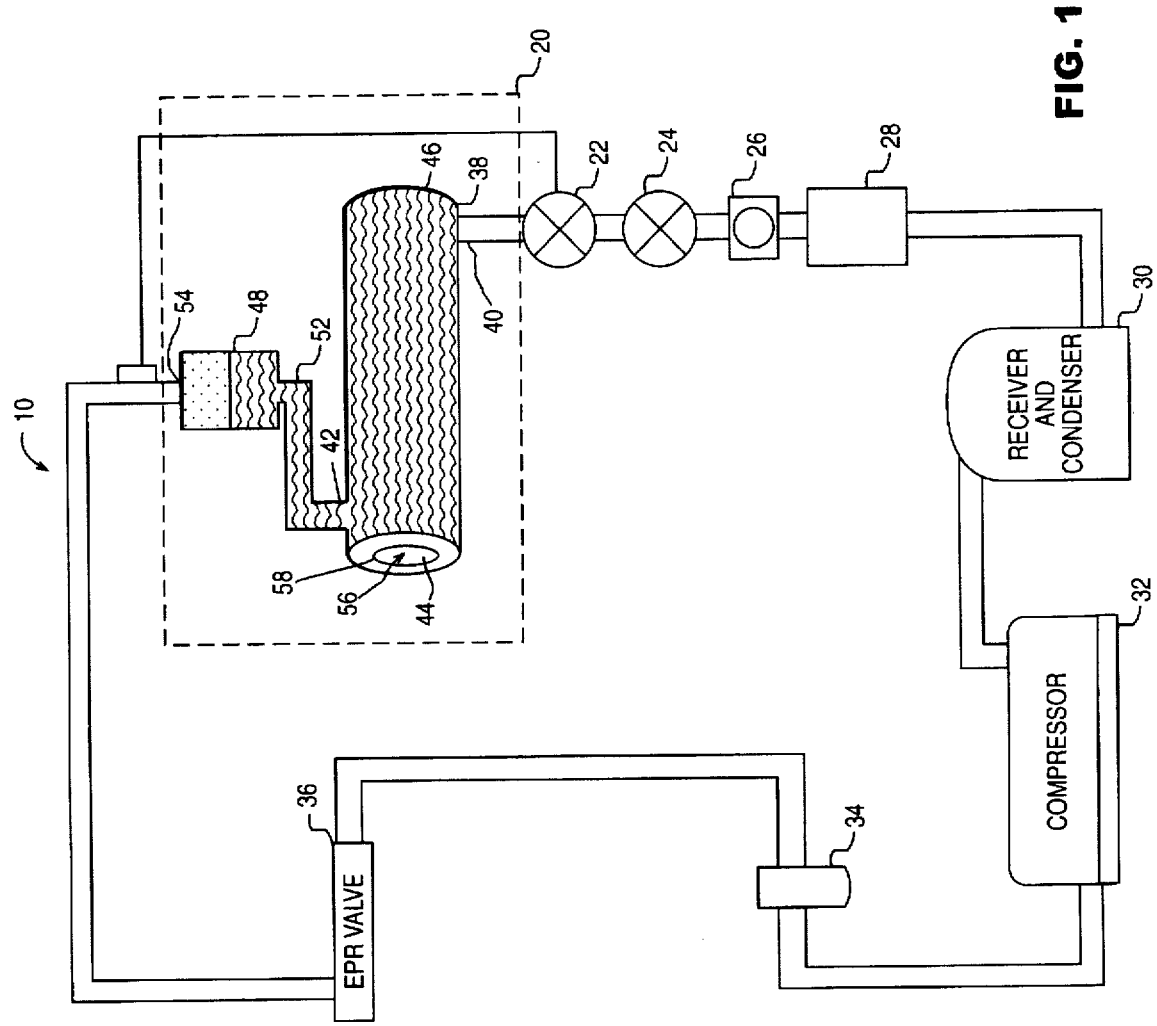
FIG. 1 is a schematic diagram illustrating an ice cream machine in accordance with an exemplary embodiment of the present invention.

A cooling system or ice cream machine 10 is diagramically shown in FIG. 1. Ice cream machine 10 includes an evaporator 20, an expansion valve 22, a solenoid valve 24, a sight glass 26, a filter 28, a condenser 30, a compressor 32, an accumulator 34, and a valve 36. Evaporator 20 includes a cylindrical cooling tank 38 and an auxiliary tank 48.

Cylindrical cooling tank 38 includes a refrigerant input 40, a refrigerant output 42, a liquid ice cream input 44, and a solid ice cream output 46. Auxiliary tank 48 includes a liquid refrigerant input 52 and a vapor refrigerant output 54. Cylindrical cooling tank 38 includes a cooling chamber 56 defined by an interior surface, wall or tube 57 of tank 38.

Auxiliary tank 48 is positioned above with respect to gravity or over cylindrical cooling tank 38. Additionally, liquid refrigerant input 52 is located above refrigerant output 42, and refrigerant input 40 of tank 38 is located beneath refrigerant output 42 of tank 38. Vapor refrigerant output 54 of tank 48 is located above liquid refrigerant input 52 of tank 48.

Figure 2:
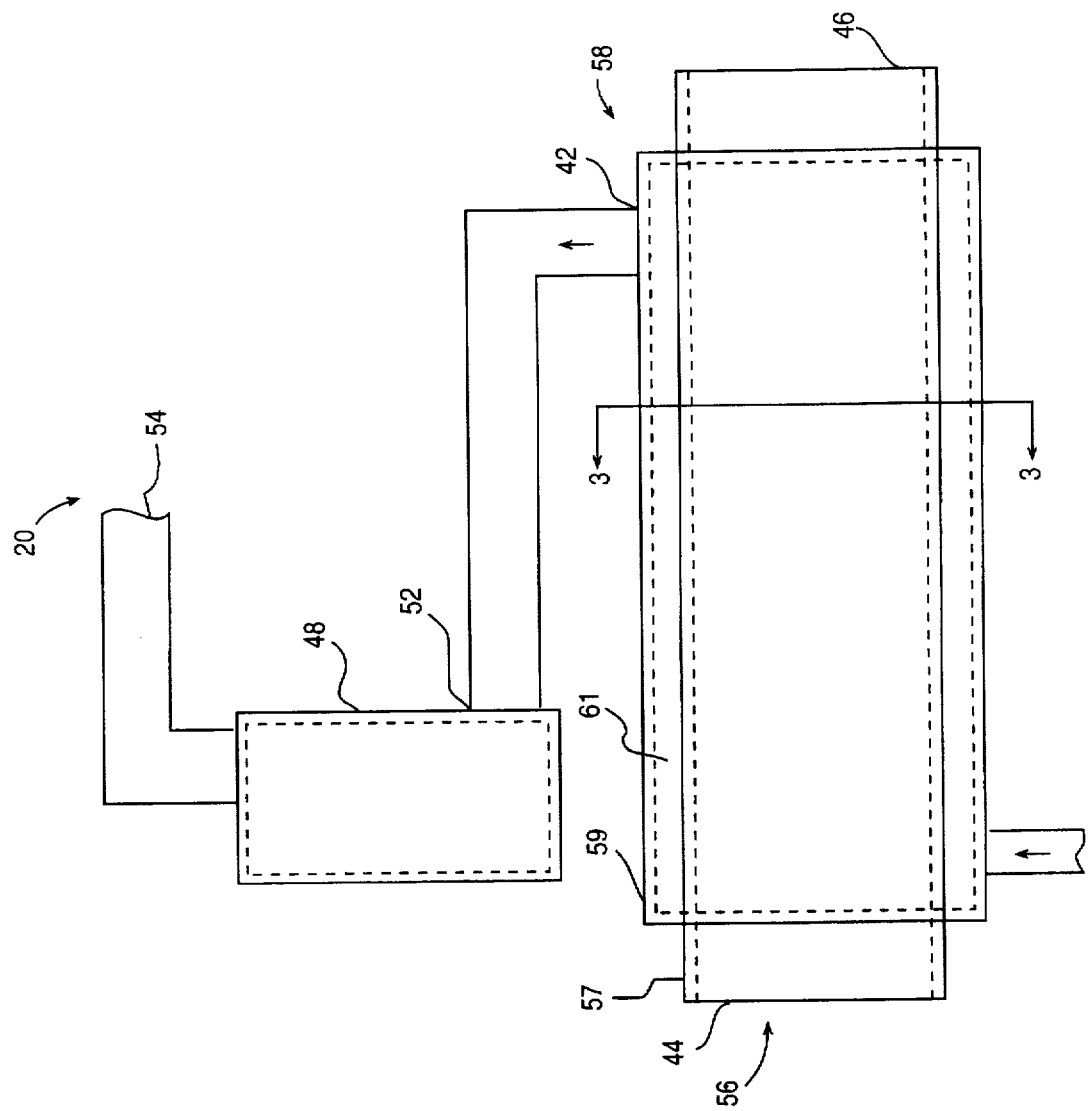
FIG. 2 is a more detailed side view schematic diagram of the cylindrical cooling tank and auxiliary tank illustrated in FIG. 1.
Figure 3:
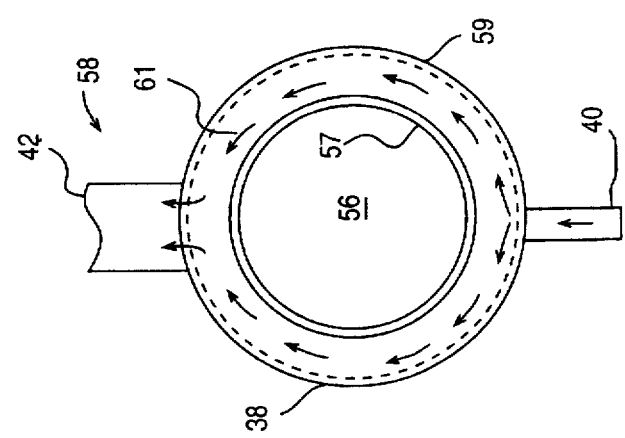
FIG. 3 is a cross-sectional view of the cylindrical cooling tank illustrated in FIG. 2 at line 3—3.

With reference to FIGS. 2 and 3, cylindrical cooling tank 58 is manufactured from an outside tube 59 having an inside diameter of 4.75 inches, an outside diameter of 5 inches, and a length of 27.75 inches, and an inner tube 57 having an inside diameter of 3.75 inches, an outside diameter of 3.875 inches, and a length of 30 inches. Preferably, wall 58 is .125 inches thick. The volume of interior cooling chamber 56 is approximately 331 cubic inches. The volume of an evaporator chamber 61 between outer tube 59 and inner tube 57 has a volume of approximately 165.1 cubic inches. Auxiliary tank 48 is preferably a piece of tubing or other container having a length of 7 inches, a width of 2 inches, and a depth of 4 inches. The approximate volume of tank 48 is 56 cubic inches.

The operation of ice cream machine 10 is described below with reference to FIGS. 1–3. Compressor 32 provides high pressure vapor refrigerant to condenser 30. Ice cream machine 10 may utilize a refrigerant such as ammonia, FREON, HP62, or other substance having a low boiling point. The type of refrigerant is not a limiting factor with respect to the present invention.

Condenser 30 provides high pressure liquid refrigerant through filter 28, sight glass 26 and solenoid valve 24 to expansion valve 22. Expansion valve 22 provides low pressure liquid refrigerant to evaporator 20. More particularly, low pressure liquid refrigerant is provided to refrigerant input 40 of cylindrical cooling tank 38. The low pressure liquid refrigerant in cooling tank 38 is boiled due to the heat from cooling chamber 56, to form low pressure vapor refrigerant which accumulates in auxiliary tank 48. The low pressure liquid refrigerant in cylindrical cooling tank 38 preferably cools or freezes the liquid ice cream from input 44 in cooling chamber 56. Although, ice cream is disclosed, other food stuffs, substances, or condiments may be utilized in machine 10.

More particularly, the warmer liquid ice cream with respect to the liquid refrigerant provided to liquid ice cream input 44 is cooled and provided as frozen ice cream at ice cream output 46 as the low pressure liquid refrigerant is transferred from liquid to vapor. The low pressure vapor refrigerant collects via auxiliary tank 48. Preferably, system 10 is provided with enough liquid refrigerant so that all of cylindrical cooling tank 38 is filled and auxiliary tank 48 is two-thirds to one-half filled with liquid refrigerant during normal operation of ice cream machine 10.

The low pressure vapor refrigerant in tank 48 travels from vapor refrigerant output 54 through valve 36 and accumulator 34 to compressor 32. Compressor 32 changes the low pressure vapor refrigerant to high pressure vapor refrigerant and provides the high pressure vapor refrigerant to condenser 30. Condenser 30 changes the high pressure vapor refrigerant to high pressure liquid refrigerant which is provided to valve 22.

The flooding of tank 38 advantageously provides even cooling as liquid ice cream travels from ice cream input 44 to ice cream output 46 because the temperature and pressure of the low pressure liquid refrigerant in cylindrical cooling tank 38 is maintained constant. Therefore, the ice cream in cooling chamber 56 is chilled evenly wherever it is vertically located within cooling chamber 56. Prior art cooling tanks tended to chill the ice cream unevenly near the top of the evaporator because liquid refrigerant was only located on the bottom of the evaporator.

The use of such an advantageous evaporator 20 allows system 10 to be designed with a relatively small compressor 32. The small size of compressor 32 makes ice cream machine 10 less expensive and more energy efficient. Preferably, auxiliary tank 48 may be a coil of copper tubing located above cylindrical cooling tank 38. Preferably, auxiliary tank 48 is a tank located above cylindrical cooling tank 38 such as a cylindrical or spherical tank, reservoir, can, or other container. Cylindrical cooling tank 38 preferably has almost three times the volume of auxiliary tank 48.

It is understood that, while the detailed drawings and specific examples given to describe the preferred exemplary embodiment of the present invention, they are for the purpose of illustration only. The apparatus of the invention is not limited to the precise details and conditions disclosed. For example, although food stuffs and ice cream are mentioned, the invention may be utilized in a variety of refrigeration or cooling systems. Further, single lines for carrying liquid refrigerant can represent multiple tubes. Additionally, although a particular valve, accumulator, compressor, condenser and filter configuration is shown, the advantageous evaporator 20 may be utilized in other cooling systems. Various changes can be made to the details disclosed without departing from the spirit of the invention which is defined by the following claims.

We claim:

1. A frozen custard making machine, comprising:

a cylindrical evaporator having a refrigerant input, and a refrigerant output, the cylindrical evaporator having an interior surface defining a cooling chamber, the cooling chamber having a custard input and a custard output, the evaporator having an outside surface, the outside surface and the interior surface defining an evaporator chamber, the refrigerant input being below the refrigerant output, the refrigerant input and the refrigerant output being in fluid communication with the evaporator chamber;

an evaporator reservoir having a reservoir input and a reservoir output, the reservoir input being coupled to the refrigerant output, the evaporator reservoir being located above the cylindrical evaporator with respect to gravity;

a compressor having a compressor input coupled to the reservoir output and a compressor output; and a condenser having a condenser input coupled to the compressor output and a condenser output coupled to the refrigerant input, whereby a refrigerant travels from the condenser through the cylindrical evaporator and the evaporator reservoir to the compressor, the refrigerant being a liquid in the cylindrical evaporator, the refrigerant being a liquid in the cylindrical evaporator reservoir, thereby providing superior cooling in the cylindrical evaporator.

2. The frozen custard making machine of claim 1, wherein the evaporator reservoir is a length of copper tubing significantly longer than a distance from the compressor to the evaporator reservoir.

3. The frozen custard making machine of claim 1, wherein the evaporator reservoir is a tank.

4. The frozen custard making machine of claim 3 wherein the tank has a volume at least .33 times a volume of the evaporator chamber of the cylindrical evaporator.

5. The frozen custard making machine of claim 1, wherein liquid custard product is provided to the custard input and frozen custard product is provided by the custard output.

6. The frozen custard making machine of claim 1, wherein the evaporator reservoir is two-thirds filled with the liquid.

7. A frozen custard making system comprising:

a compressor;

an evaporator in the shape of a hollow cylinder, the evaporator having a refrigerant input and a refrigerant output, the evaporator having an interior surface defining a cooling chamber for chilling a custard product, the evaporator having an outside surface, the inside surface and the outside surface defining an evaporator chamber; and an auxiliary evaporator means, positioned above the evaporator with respect to gravity, for receiving a liquid refrigerant from the refrigerant output of the evaporator and providing a vapor refrigerant to the compressor, the compressor receiving the vapor refrigerant and providing the liquid refrigerant to the evaporator, whereby superior cooling of the custard product in the evaporator is attained by completely filling the evaporator with the liquid refrigerant, the auxiliary evaporator means causing the evaporator to be completely filled with the liquid refrigerant.

8. The frozen custard making system of claim 7, wherein the auxiliary evaporator means is a length of copper tubing significantly longer than a distance from the compressor to the evaporator.

9. The frozen custard making system of claim 8, wherein the copper tubing is wound in a coil above the evaporator.

10. The frozen custard making system of claim 7, wherein the auxiliary evaporator means is a cylindrical tank.

11. The frozen custard making system of claim 10 wherein the tank has a volume at least .33 times a volume of the evaporator.

12. The frozen custard making system of claim 7, wherein the custard product is frozen in the evaporator.

13. the frozen custard making system of claim 7, wherein the auxiliary evaporator means is two-thirds filled with the liquid refrigerant.

14. The frozen custard making system of claim 12, wherein the auxiliary evaporator means is a length of copper tubing longer than the distance between the evaporator and the compressor.

15. The frozen custard making system of claim 13, whereby the auxiliary evaporator means provides superior cooling in the evaporator.

16. A custard freezing machine comprising:

a tubular evaporator having a refrigerant input at a bottom side of the evaporator, and a refrigerant output at a top side of the evaporator, the tubular evaporator having an interior surface defining an interior cooling chamber, and an exterior surface, the interior surface and the exterior surface defining an evaporator chamber having a volume, the cooling chamber having a custard input and a custard output;

a compressor having a compressor input and a compressor output;

a condenser having a condenser input coupled to the compressor output and a condenser output coupled to the refrigerant input; and an evaporator reservoir having a reservoir input coupled to the refrigerant output, and a reservoir output coupled to the compressor input, the evaporator reservoir being located above the cylindrical evaporator with respect to gravity, whereby a refrigerant travels from the condenser through the cylindrical evaporator and the evaporator reservoir to the compressor, the refrigerant being a liquid in the cylindrical evaporator, the refrigerant accumulating as a vapor in the evaporator reservoir, thereby providing superior cooling in the cooling chamber.

17. The custard freezing machine of claim 16, wherein the evaporator reservoir is a length of tubing substantially longer than the distance between the evaporator and the compressor.

18. The custard freezing machine of claim 17, wherein the tubular evaporator is flooded with the liquid and the evaporator reservoir is two-thirds filled with the liquid.

19. The custard freezing machine of claim 17, wherein the tubing is coiled.

20. The custard freezing machine of claim 16, wherein the auxiliary reservoir is a cylindrical tank.

* * * * *